(12) United States Patent
Zhu et al.

(10) Patent No.: US 12,569,841 B2
(45) Date of Patent: Mar. 10, 2026

(54) ROTARY EVAPORATOR AND METHOD FOR CATALYST PREPARATION

(71) Applicant: Saudi Arabian Oil Company, Dhahran (SA)

(72) Inventors: Guanghui Zhu, Dhahran (SA); Omer R. Koseoglu, Dhahran (SA); Ali Alzaid, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 15 days.

(21) Appl. No.: 18/329,117

(22) Filed: Jun. 5, 2023

(65) Prior Publication Data

US 2024/0399355 A1 Dec. 5, 2024

(51) Int. Cl.
B01J 37/02 (2006.01)
B01B 1/00 (2006.01)

(52) U.S. Cl.
CPC ........... B01J 37/0201 (2013.01); B01B 1/005 (2013.01)

(58) Field of Classification Search
CPC .............................. B01B 1/005; B01J 37/0201
See application file for complete search history.

(56) References Cited

U.S. PATENT DOCUMENTS 4,667,730 A * 5/1987 Zemp .................. G05D 23/1393
122/15.1
4,790,911 A * 12/1988 Parkinson .............. B01D 1/228
159/DIG. 7

6,615,914 B1 * 9/2003 Young .................. B01J 19/0013
62/51.1
2016/0074854 A1 * 3/2016 Noll ..................... B01J 37/0054
502/100
2016/0185741 A1 * 6/2016 Teles ........................ B01J 35/40
549/531

FOREIGN PATENT DOCUMENTS

CN 107837825 A * 3/2018 ............ B01J 35/026
DE 10256651 B4 11/2006
(Continued)

OTHER PUBLICATIONS

Werner (EP 2161062) (Year: 2010).*
(Continued)

*Primary Examiner* — Dah-Wei D. Yuan
*Assistant Examiner* — Stephen A Kitt
(74) *Attorney, Agent, or Firm* — DINSMORE & SHOHL LLP

(57) ABSTRACT

In accordance with one or more embodiments of the present disclosure, a rotary evaporator is disclosed. The rotary evaporator may include a base, an evaporation vessel, a rotary union, a motor for rotating the evaporation vessel, a heat jacket, a purge tube and a purge system. The evaporation vessel includes a mounting end that is coupled to the rotary union and an opposite end, with an opening defined in the opposite end and a reservoir in communication with the opening for receiving a sample through the opening. The heat jacket heats or cools the sample when contained in the evaporation vessel, and the purge system controllably supplies fluid to the evaporation vessel via the purge tube.

20 Claims, 6 Drawing Sheets

(56) References Cited

FOREIGN PATENT DOCUMENTS

| | | | | |
|---|---|---|---|---|
| EP | 628330 A1 * | 12/1994 | .......... | B01D 1/0017 |
| EP | 2161062 A2 * | 3/2010 | .......... | B01D 1/0029 |

OTHER PUBLICATIONS

Werner (EP 0628330) (Year: 1994).*
Lin (CN 107837825) (Year: 2018).*
Lepage, et al. "Chapter 5: the preparation of catalysts", Applied heterogeneous catalysis. Design-manufacture use of solid catalysts, 1987.
Perego et al., "Catalyst preparation methods", Catalysts Today, vol. 34, pp. 281-305, 1997.

* cited by examiner

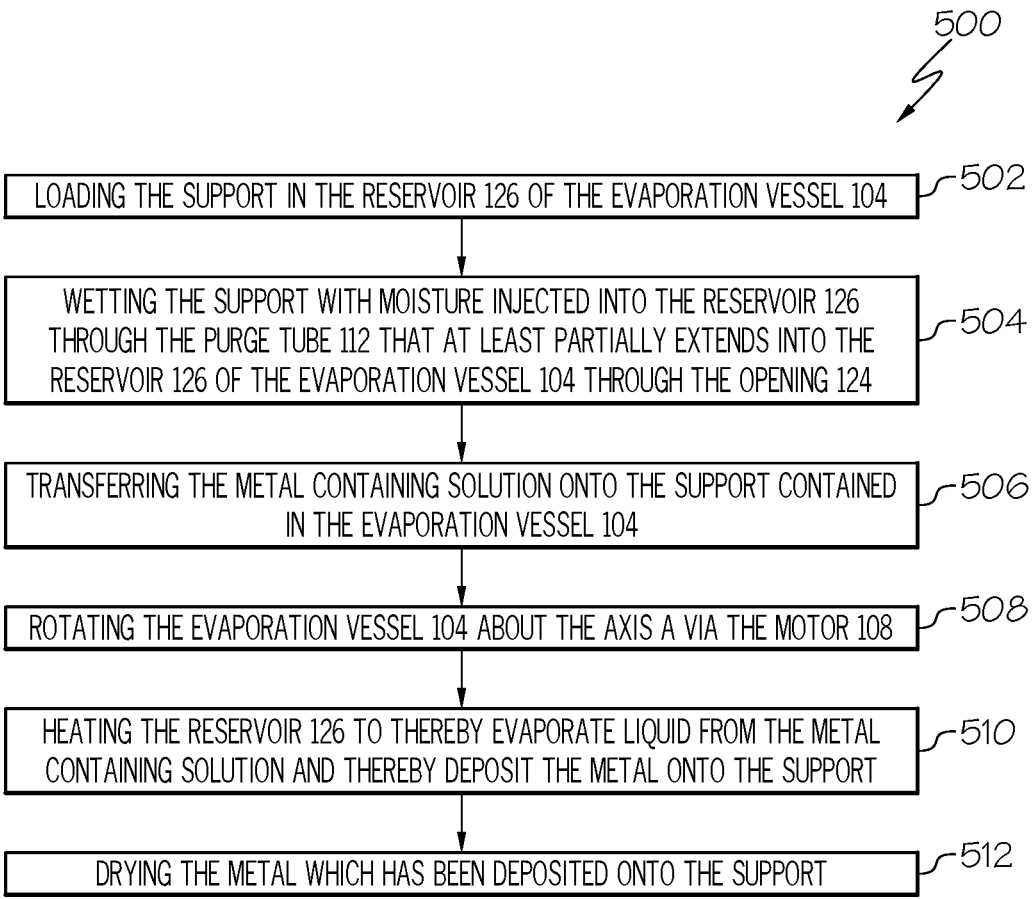

500

LOADING THE SUPPORT IN THE RESERVOIR 126 OF THE EVAPORATION VESSEL 104 — 502

WETTING THE SUPPORT WITH MOISTURE INJECTED INTO THE RESERVOIR 126 THROUGH THE PURGE TUBE 112 THAT AT LEAST PARTIALLY EXTENDS INTO THE RESERVOIR 126 OF THE EVAPORATION VESSEL 104 THROUGH THE OPENING 124 — 504

TRANSFERRING THE METAL CONTAINING SOLUTION ONTO THE SUPPORT CONTAINED IN THE EVAPORATION VESSEL 104 — 506

ROTATING THE EVAPORATION VESSEL 104 ABOUT THE AXIS A VIA THE MOTOR 108 — 508

HEATING THE RESERVOIR 126 TO THEREBY EVAPORATE LIQUID FROM THE METAL CONTAINING SOLUTION AND THEREBY DEPOSIT THE METAL ONTO THE SUPPORT — 510

DRYING THE METAL WHICH HAS BEEN DEPOSITED ONTO THE SUPPORT — 512

FIG. 5

ROTARY EVAPORATOR AND METHOD FOR CATALYST PREPARATION

BACKGROUND

The present disclosure relates to catalyst preparation and, more particularly, to catalyst preparation through evaporative processes.

The present inventors recognize wet impregnation as an appropriate method for adding a metal onto a catalyst support. With wet impregnation, after introducing metal solution to the catalyst support, the liquid of the metal solution is evaporated and the metal deposits onto the catalyst support. During this evaporation process, the catalyst support needs to be thoroughly mixed with the metal solution to have uniform impregnation. A rotary evaporator can be used for the evaporation process, wherein the evaporation of the liquid (e.g., water) from the metal solution occurs within an evaporation vessel of the rotary evaporator. However, the present inventors have recognized that with evaporation vessels that include a neck portion, the neck portion may be too small and difficult to access, thereby making it difficult to mix the catalyst support and the metal solution during use. The present inventors have also recognized that, with wet impregnation, a significant amount of heat is quickly generated when the catalyst support is exposed to the metal solution due to the water adsorption on the catalyst support, and such heat will vaporize the water inside the pore of the catalyst support and build up pressure in the capillary channel, thereby causing the catalyst support to fracture. Accordingly, the present inventors have recognized a need for an improved rotary evaporator.

SUMMARY

According to the subject matter of the present disclosure, a rotary evaporator includes a base; an evaporation vessel having a mounting end and an opposite end, the evaporation vessel comprising an opening defined in the opposite end and a reservoir in communication with the opening for receiving a sample through the opening; a rotary union having a fixed section and a rotating section that is rotatably coupled to the fixed section, wherein the fixed section extends along an axis and is fixedly coupled to the base, and wherein the rotating section is coupled to the mounting end of the evaporation vessel such that the rotating section of the rotary union and the evaporation vessel are rotatable about the axis relative to the fixed section of the rotary union and the base; a motor operable to cause rotation of the rotating section of the rotary union and the evaporation vessel about the axis; a heat jacket for heating or cooling the sample when contained in the evaporation vessel; a purge tube at least partially extending into the reservoir of the evaporation vessel through the opening, such that a vapor channel is defined between an inner surface of the reservoir and an outer surface of the purge tube; and a purge system for controllably supplying fluid to the evaporation vessel via the purge tube, wherein the fluid comprises water vapor, gas, or a combination thereof.

In accordance with one embodiment of the present disclosure, a method of impregnating metal from a metal containing solution onto a catalyst support is disclosed. The method includes loading the catalyst support in a reservoir of an evaporation vessel, wherein: the evaporation vessel comprises a mounting end, an opposite end that is opposite the mounting end, and an opening defined in the opposite end that is in communication with the reservoir and through which the catalyst support is loaded, and the mounting end of the evaporation vessel is coupled to a rotary union, the rotary union comprising a fixed section and a rotating section that is rotatable relative to the fixed section, with the fixed section extending along an axis and being fixedly coupled to a base, and with the rotating section being coupled to the mounting end of the evaporation vessel such that the rotating section of the rotary union and the evaporation vessel are rotatable together about the axis relative to the fixed section of the rotary union and the base; wetting the catalyst support with water vapor injected into the reservoir through a purge tube that at least partially extends into the reservoir of the evaporation vessel through the opening; transferring the metal containing solution onto the catalyst support contained in the evaporation vessel; rotating the evaporation vessel about the axis via a motor; and heating the reservoir to thereby evaporate liquid from the metal containing solution and thereby deposit the metal onto the catalyst support.

Additional features and advantages of the embodiments described herein will be set forth in the detailed description which follows, and in part will be readily apparent to those skilled in the art from that description or recognized by practicing the embodiments described, including the detailed description and the claims which are provided infra.

BRIEF DESCRIPTION OF THE DRAWINGS

The following detailed description of specific embodiments of the present disclosure can be best understood when read in conjunction with the following drawings, where like structure is indicated with like reference numerals and in which:

FIG. 5 is a flowchart of an example method of using the rotary evaporator of FIG. 1, according to one or more embodiments shown and described herein.

DETAILED DESCRIPTION

The present disclosure is directed to rotary evaporator apparatuses for facilitating mixing and accessing contents contained within the reservoir thereof and for controlling heat generation during catalyst preparation and methods of the same. Embodiments of the presently disclosed rotary evaporators include an evaporation vessel having a mounting end and an opposite end, wherein the mounting end is rotatably coupled to a base and the opposite end includes an opening through which the catalyst support and metal solution may be accessed, for example, in order to be mixed. Embodiments of the presently disclosed rotary evaporators also include a purge tube and a purge system for controlling heat generation by supplying fluid to the catalyst support within the reservoir, wherein the purge tube extends into the reservoir through the opening in the opposite end of the evaporation vessel. Embodiments herein are also directed towards a method of impregnating metal from a metal containing solution onto a catalyst support. In embodiments, the includes loading the catalyst support in a reservoir of an evaporation vessel, wetting the catalyst support with water vapor injected into the reservoir through a purge tube that at least partially extends into the reservoir of the evaporation vessel through the opening, transferring the metal containing solution onto the catalyst support contained in the evaporation vessel, rotating the evaporation vessel about the axis via a motor, and evaporating liquid from the metal containing solution to thereby deposit the metal onto the catalyst support.

Figure 1:
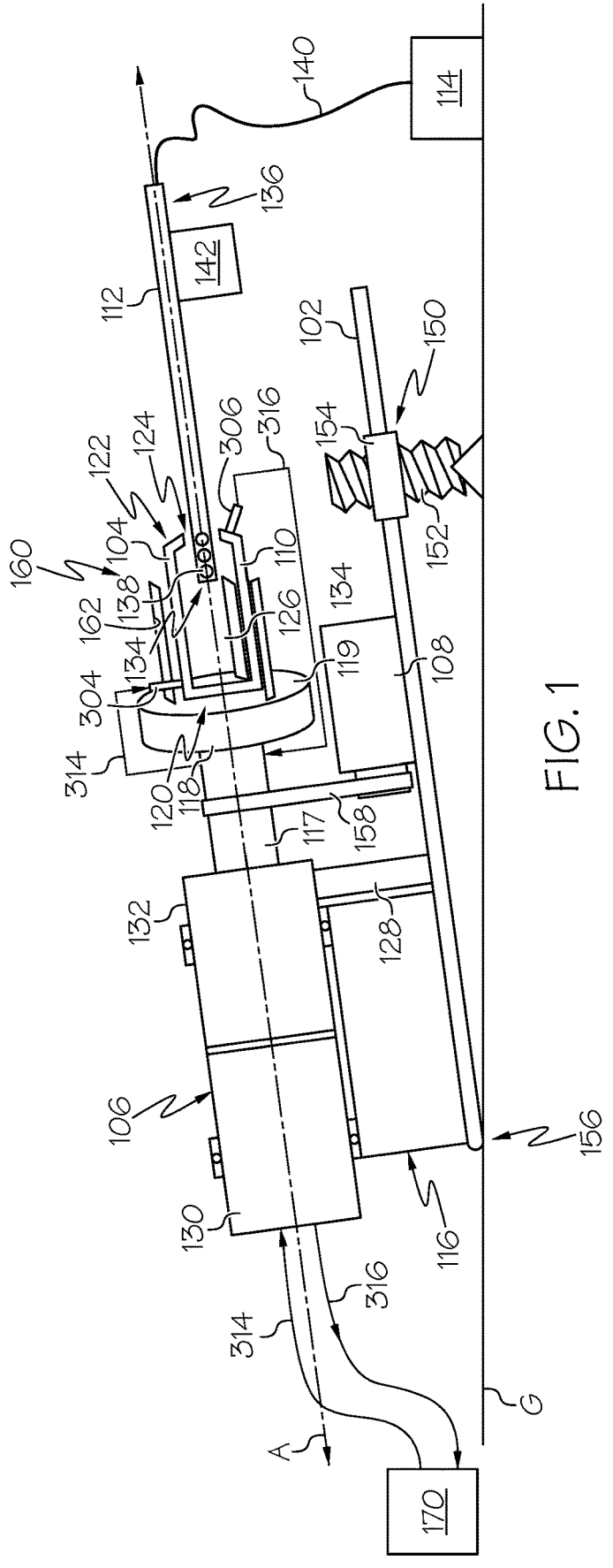
FIG. 1 schematically depicts a rotary evaporator, according to one or more embodiments of the present disclosure.

FIG. 1 schematically depicts a rotary evaporator 100, according to one or more embodiments shown and described herein. As described herein, the rotary evaporator 100 is operable to remove solvent from a sample and, more specifically, to impregnate metal from a metal containing solution onto a catalyst support. In the illustrated embodiment, the rotary evaporator 100 includes a base 102, an evaporation vessel 104, a rotary union 106, a motor 108, a heat jacket 110, a purge tube 112, and a purge system 114. As shown, the base 102 is disposed on a ground surface G and defines a support structure on which the various components of the rotary evaporator 100 are supported.

In the illustrated embodiment, the evaporation vessel 104 includes a mounting end 120 and an opposite end 122 that is opposite the mounting end 120. Here, the evaporation vessel 104 includes an opening 124 defined in the opposite end 122 and a reservoir 126 in communication with the opening 124 for receiving a sample through the opening 124. As shown, the mounting end 120 is closed and sidewalls 320 (see FIG. 3) extending between the mounting end 120 and the opposite end 122 are continuous, such that the reservoir 126 is only accessible through the opening 124. In this manner, the operator is able to access the reservoir 126 during operation of the rotary evaporator 100 due to the opening 124 being positioned such that it faces opposite the rotary union 106, as shown in FIG. 1, which contrasts with conventional rotary evaporators whose vessel openings face the rotary union and are clamped to the collar such that their vessel openings are only accessible when the vessel is removed or detached from the collar. Further, the opening 124 in the opposite end 122 of the evaporation vessel 104 may have various sizes/dimensions depending on the end use parameters and, in some embodiments, a diameter of the opening 124 is greater than or equal to 5 centimeters ("cm").

As depicted in FIG. 1, the rotary union 106 includes a fixed section 130 and a rotating section 132 that is rotatably coupled to the fixed section 130. The fixed section 130 extends along an axis A and is fixedly coupled to the base 102. The rotating section 132 is coupled to the mounting end 120 of the evaporation vessel 104 such that the rotating section 132 of the rotary union 106 and the evaporation vessel 104 are rotatable about the axis A relative to the fixed section 130 of the rotary union 106 and the base 102. Further, the motor 108 is operable to cause rotation of the rotating section 132 of the rotary union 106, and thereby cause rotation of the evaporation vessel 104, about the axis A. As described herein, the motor 108 may have an adjustable rotation speed and, in embodiments, the motor 108 may be a belt drive motor or a direct drive motor. Additionally, the heat jacket 110 is operable for heating and/or cooling the sample contained in the evaporation vessel 104.

In the illustrated embodiment, the rotary union 106 is coupled to the base 102 via a trunnion or carriage 116. As shown, the trunnion 116 is mounted to a surface of the base 102 and the rotary union 106 is supported in a cradle portion of the trunnion 116 such that the rotating section 132 of the rotary union 106 and the evaporation vessel 104 are rotatable about the axis A relative to the fixed section 130 of the rotary union 106 and the trunnion 116 (and the base 102). Also in the illustrated embodiment, a shaft 117 and a mounting plate 118 are supported by and extend from the rotating section 132 of the rotary union 106 such that the shaft 117 and the mounting plate 118 rotate with the rotating section 132 of the rotary union 106, relative to the fixed section 130 of the rotary union 106 and the trunnion 116 (and the base 102). The shaft 117 has a first end that is connected to the rotating section 132 of the rotary union 106 and a second end that is (opposite the first end and) connected to the mounting plate 118. As shown, the shaft 117 extends along the axis A such that the shaft 117 and the mounting plate 118 are cantilevered and supported only at the first end of the shaft 117 via the rotary union 106. With this construction, the opening 124 in the opposite end 122 of the evaporation vessel 104 is positioned such that the opening 124 faces away from the rotary union 106 and other components of the rotary evaporator 100, thereby making it easier for the operator to access the reservoir 126 during operation of the rotary evaporator 100, as mentioned above.

As mentioned above, the evaporation vessel 104 is supported by the mounting plate 118 and the shaft 117 which extend from the rotating section 132 of the rotary union 106. In some embodiments, the mounting plate 118 and the shaft 117 are only supported by the rotary union 106 and otherwise unsupported; however, in some embodiments, the mounting plate 118 and the shaft 117 are supported by another structure in addition to the rotary union 106. For example, as shown in FIG. 1, the rotary evaporator 100 may further include a support wheel 128 supporting the rotating section 132 of the rotary union 106. In other embodiments, the support wheel 128 may be located differently than as illustrated such that the support wheel 128 supports another portion of the rotary evaporator 100, for example, the support wheel 128 may be positioned so as to engage and support the shaft 117 and/or the mounting plate 118.

As mentioned, the rotary evaporator 100 includes the purge tube 112 operable to supply a purge gas and/or water vapor to the reservoir 126. The purge tube 112 includes an output end 134 and an input end 136 that is opposite the output end 134. The purge tube 112 is hollow such that an inner lumen (not shown) is defined within the purge tube 112 that extends between the output end 134 and the input end 136. Further, the purge tube 112 includes at least one opening 138 at the output end 134 that is in communication with the lumen and through which the purge gas and/or water vapor may exit the purge tube 112 and enter the reservoir 126. In the illustrated embodiment, the at least one opening 138 is positioned on a sidewall of the purge tube 112; however, in embodiments, the at least one opening 138 may also or instead be located at a terminal end of the output end 134.

The purge tube 112 is at least partially extendable into the reservoir 126 of the evaporation vessel 104 through the opening 124. As illustrated, when the purge tube 112 is positioned to extend into the reservoir 126, the output end 134 of the purge tube 112 is located within the reservoir 126 of the evaporation vessel 104. By at least partially extending the purge tube 112 into the reservoir 126, a vapor channel is defined between an inner surface of the reservoir and an outer surface of the purge tube, by which vapor may exit the reservoir 126 and facilitate evaporation.

In embodiments, the purge tube 112 is supported by a component of the rotary evaporator 100. For example, the purge tube 112 may be supported or installed on the base 102. However, the purge tube 112 may also or instead be supported by an external component that is unattached to the base 102.

The purge tube 112 is in communication with the purge system 114 and receives the purge gas and/or water vapor from the purge system 114, which is operable for controllably supplying fluid (i.e., the purge gas and/or the water vapor) to the evaporation vessel 104 via the purge tube 112. In the illustrated embodiment, the input end 136 of the purge tube 112 is in communication with the purge system 114 via a conduit 140 (e.g., a hose). As previously mentioned, heat is generated when the catalyst support is exposed to the metal solution due to the water adsorption on the catalyst support, and such heat generation will vaporize water inside the catalyst pore and build up pressure which eventually will result in fracture of the catalyst support; the purge tube 112 and purge system 114 may be utilized to control such heat generated within the reservoir 126.

Figure 2:
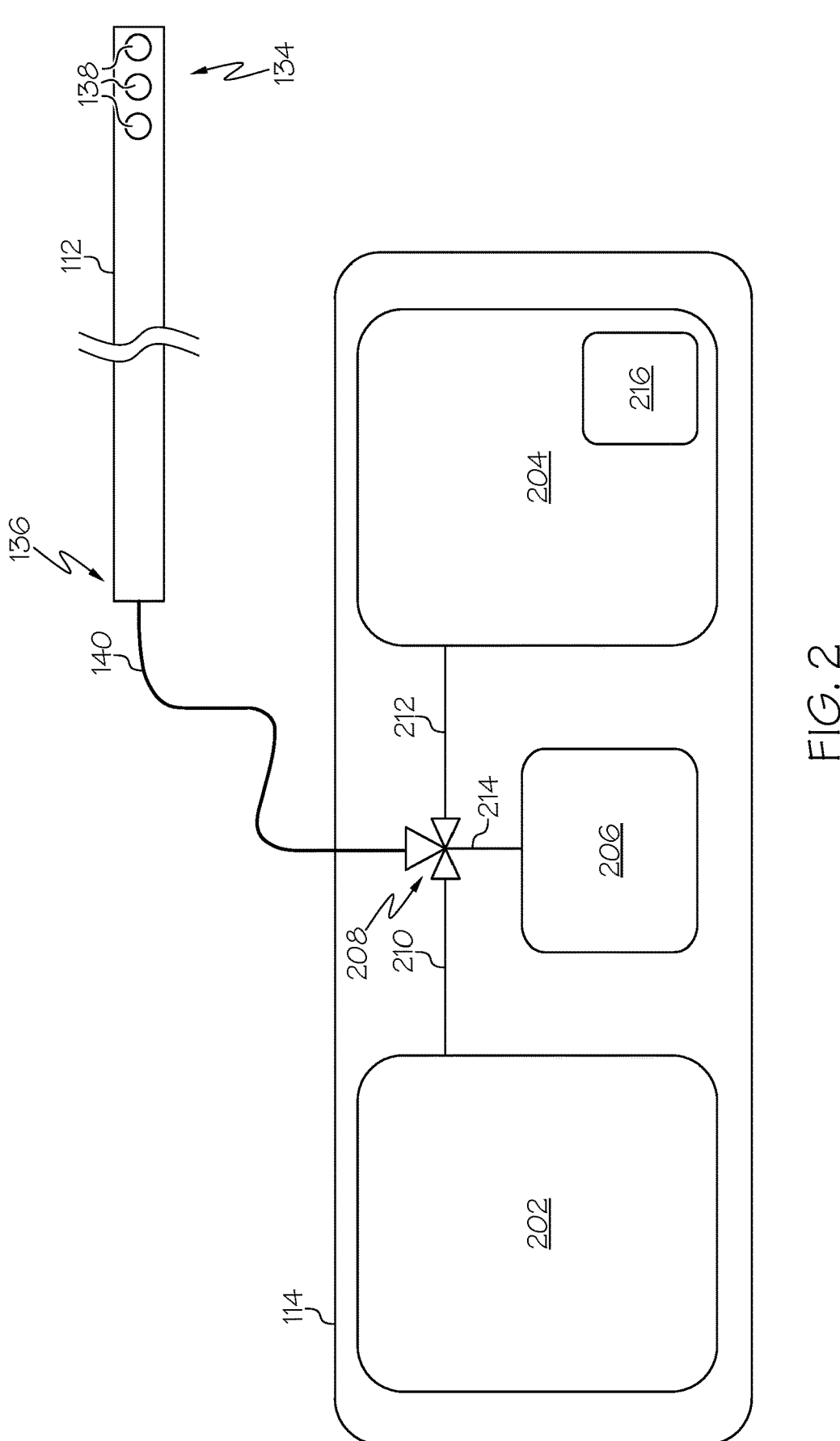
FIG. 2 schematically depicts a purge tube and purge system utilizable with the rotary evaporator of FIG. 1, according to one or more embodiments of the present disclosure.

FIG. 2 schematically depicts the purge system 114 in communication with the purge tube 112, according to one or more embodiments shown and described herein. In the illustrated embodiment, the purge system 114 includes a water vapor dispenser 202, a gas dispenser 204, a controller 206, and at least one valve 208.

The water vapor dispenser 202 is in communication with the inner lumen of the purge tube 112 for supplying water vapor to within the evaporation vessel 104. Similarly, the gas dispenser 204 is in communication with the inner lumen of the purge tube 112 for supplying purge gas to within the evaporation vessel 104. While the illustrated embodiment incorporates both the water vapor dispenser 202 and the gas dispenser 204, in other embodiments the purge system 114 includes just the water vapor dispenser 202 or the gas dispenser 204. In the illustrated embodiment, the water vapor dispenser 202 supplies water vapor to the purge tube 112; however, the water vapor dispenser 202 may store other fluids or vapors that may be desirable to introduce into the reservoir 126 other than water vapor. In embodiments, the gas dispenser 204 supplies dry purge gas (e.g., air) to the purge tube 112; however, other suitable purge gases which may be stored in the gas dispenser 204 include, but are not limited to, Nitrogen, Argon, Helium, an inert gas, etc. In embodiments, the controller 206 is a mass flow controller.

In the illustrated embodiment, the water vapor dispenser 202 is fluidly coupled to the at least one valve 208 via a first supply line 210 and the gas dispenser 204 is fluidly coupled to the at least one valve 208 via a second supply line 212. In embodiments, the at least one valve 208 includes a rotary meter valve. The at least one valve 208 is operable to at least partially close the first supply line 210 and/or the second supply line 212 so as to control the volume and/or flow rate of the water vapor and/or gas being introduced into the purge tube 112 via the conduit 140. Thus, the at least one valve 208 may fully close the second supply line 212 and maintain the first supply line 210 in an at least partially open condition such that only water vapor from the water vapor dispenser 202 flows into the conduit 140, the at least one valve 208 may fully close the first supply line 210 and maintain the second supply line 212 in an at least partially open condition such that only purge gas from the gas dispenser 204 flows into the conduit 140, or the at least one valve 208 may maintain both the first supply line 210 and the second supply line 212 in an at least partially open condition such that a mixture of water vapor and purge gas flows into the conduit 140 and into the purge tube 112. In embodiments, the purge gas is a dry gas, and water vapor may be mixed therewith, for example, the water vapor content may be at least 0.5% and at most 50% of the mixture.

The controller 206 is communicably coupled to the at least one valve 208 and operable to control operation of the at least one valve 208, to thereby control the amount (if any) of the water vapor and/or gas supplied to the evaporation vessel 104 from the water vapor dispenser 202 and/or the gas dispenser 204. In the illustrated embodiment, the controller 206 is in communication with the at least one valve 208 via a wire 214; however, in other embodiments, the controller 206 (or either or both of the water vapor dispenser 202 and the gas dispenser 204) communicates wirelessly with the at least one valve 208. In other embodiments, the mass flow controller 206 is integrated into either or both of the water vapor dispenser 202 and the gas dispenser 204.

In embodiments where the purge system 114 includes the gas dispenser 204, a heater 216 may be provided for controlling the temperature of the purge gas supplied thereby to the evaporation vessel 104. For example, the heater 216 may be integrated into the gas dispenser 204 as shown in FIG. 2. In embodiments, the heater 216 may be in communication with the controller 206; however, in other embodiments, the heater 216 may be separately controlled via another control means, such as an external computer or external controller.

Referring again to FIG. 1, the purge tube 112 may be adjustable relative to the evaporation vessel 104. In this manner, the location of the at least one opening 138 of the purge tube 112 within the reservoir 126 may be adjusted or moved to thereby affect evaporation occurring within the reservoir 126 (i.e., the distance that the output end 134 of the purge tube 112 extends into the evaporation vessel 104 may be adjusted). In embodiments, the at least one opening 138 may be formed (e.g., drilled) with a particular angle/orientation so as to direct the purge gas and/or water vapor in a desired manner. For example, if relatively less purge gas and/or water vapor is desired, the at least one opening 138 may be formed such that it is oriented towards the opening 124 in the evaporation vessel 104, so that the purge gas and/or water vapor spends less time within the reservoir 126. In embodiments, an actuator 142 is operatively coupled to the purge tube 112 for moving the purge tube 112 relative to the evaporation vessel 104 and thereby adjusting the location of the at least one opening 138 within the reservoir 126. For example, the actuator 142 may be actuated to move the output end 134 of the purge tube 112 nearer to or further from the mounting end 120 of the evaporation vessel 104.

In embodiments, the base 102 is configured to be tilted to thereby adjust orientation of the evaporation vessel 104 relative to the ground surface G. For example, FIG. 1 illustrates an embodiment where the rotary evaporator 100 includes an orientation adjustment mechanism 150 that is operable to adjust orientation of the rotary evaporator 100. Here, the orientation adjustment mechanism 150 includes a threaded fastener 152 (e.g., a screw) and a threaded bore 154 that mates with the threaded fastener 152, whereby rotation of the threaded fastener 152 causes the threaded bore 154 to travel along the threaded fastener 152, and thereby raise or lower the base 102 relative to the ground surface G with a portion 156 of the base 102 acting as a pivot about which the base 102 may rotate clockwise or counter-clockwise. In the illustrated embodiment, the threaded bore 154 is integral with the base 102 and the threaded fastener 152 is connected to the ground surface G, whereas, in other embodiments the threaded fastener 152 may be integral with the base 102 and the threaded bore 154 may be connected to the ground surface G.

In the illustrated embodiment, the motor 108 is disposed on the base 102; however, the motor 108 may be differently supported without departing from the present disclosure. Also in the illustrated embodiment, the motor 108 is operatively coupled to the rotating section 132 of the rotary union 106 via a belt 158. In this manner, the belt 158 transfers the force output by the motor 108 to the rotary union 106. However, different means may be utilized to transfer force from the motor 108 to the rotary union 106 without departing from the present disclosure. For example, the rotating section 132 of the rotary union 106 may be operatively coupled to the motor 108 via one or more gears. In the illustrated embodiment, the belt 158 extends around a driven sprocket of the motor 108 and a portion of the shaft 117; however, while the belt 158 is illustrated as engaging a portion of the shaft 117, the belt 158 (or other components utilized to transmit force from the motor 108, such as the above mentioned gears) may engage another portion of the rotary evaporator 100, such as the rotating section 132 of the rotary union 106 or the mounting plate 118.

As shown in FIG. 1, the evaporation vessel 104 is connected to the mounting plate 118, with the mounting end 120 of the evaporation vessel 104 facing an exposed face 119 of the mounting plate 118. In embodiments, a clamp mechanism 160 may be utilized to couple the evaporation vessel 104 to the rotating section 132 of the rotary union 106. In the illustrated embodiment, the clamp mechanism 160 is provided on the exposed face 119 of the mounting plate 118 and is adjustable so as to receive a differently sized evaporation vessel. Here, the clamp mechanism 160 includes a plurality of adjustable fingers 162 that are movably provided on the exposed face 119 and configured to retain the evaporation vessel 104 positioned between the adjustable fingers 162. In this manner, the plurality of adjustable fingers 162 are movable relative to each other, such that they may move inward towards each other so as to accommodate relatively smaller evaporation vessels or move away from each other so as to accommodate relatively larger evaporation vessels.

Figure 3:
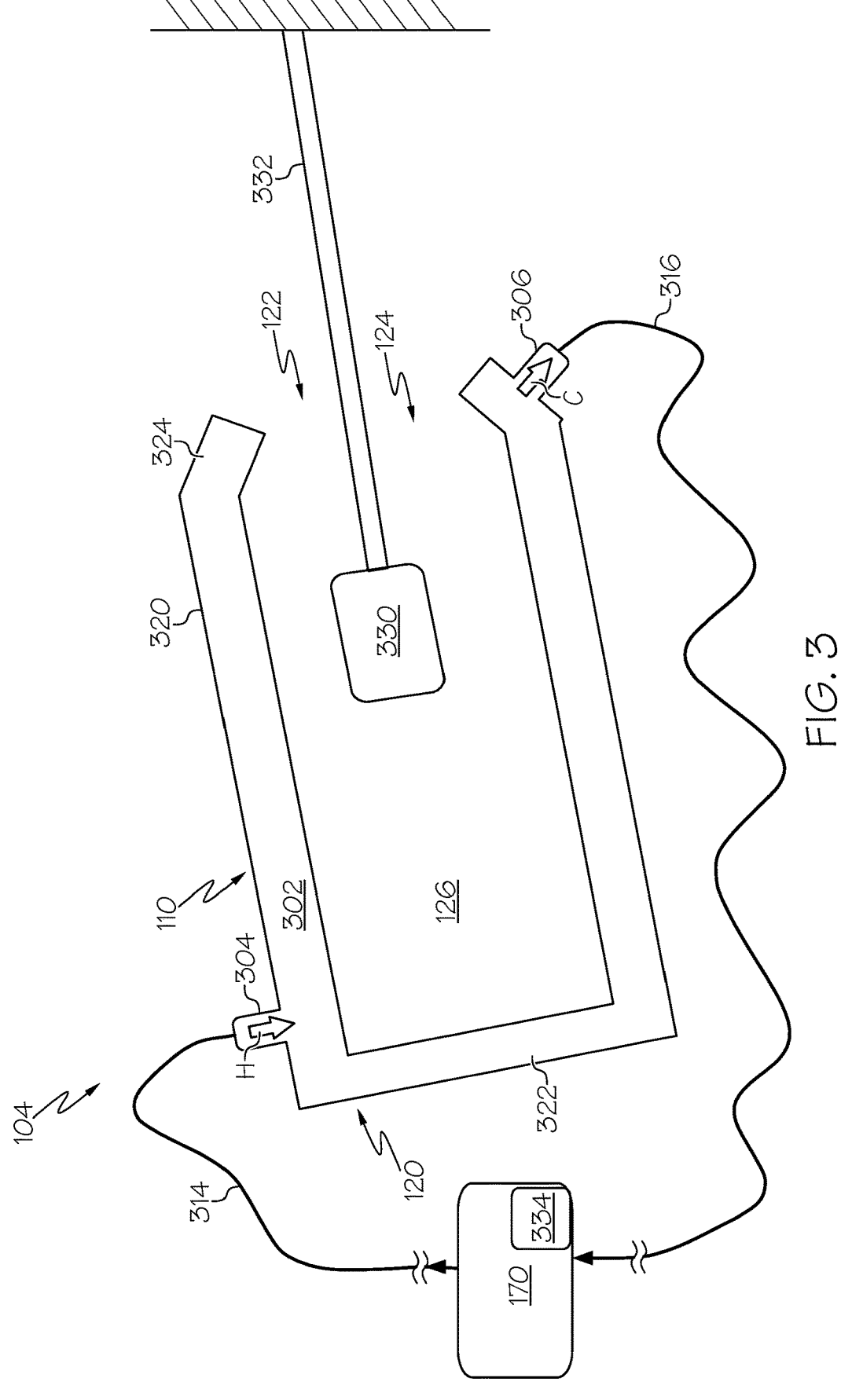
FIG. 3 schematically depicts a heat source and an evaporation vessel configured with a heat jacket utilizable with the rotary evaporator of FIG. 1, according to one or more embodiments of the present disclosure.

In the illustrated embodiment, the rotary evaporator 100 further includes a heat source 170 in communication with the heat jacket 110 for supplying a media to the heat jacket 110 for heating or cooling the heat jacket 110. The heat source 170 may include a pump component that is operable to circulate the media through the heat jacket 110 as described herein. As shown in FIG. 3, the heat jacket 110 includes a hollow interior 302 that is in fluid communication with the heat source 170. In this manner, the heated or cooled media supplied by the heat source 170 may flow into the hollow interior 302 of the heat jacket 110 in order to impart heating or cooling to the heat jacket 110 and thereby heat or cool the sample contained within the reservoir 126.

In the illustrated embodiment, the heat jacket 110 includes an input port 304 and an output port 306 that are each in communication with the hollow interior 302 of the heat jacket 110. The heat source 170 may supply various types of media to the heat jacket 110 in order to heat or cool the contents within the reservoir 126, including but not limited to water, steam, or ethanol glycol. In embodiments, heated media H enters the hollow interior 302 of the heat jacket 110 through the input port 304, and then circulates within the hollow interior 302 to thereby heat and ultimately cause evaporation of a sample in the reservoir 126. The energy of the heated media H eventually dissipates such that the heated media H becomes a cooled media C, which exits the hollow interior 302 of the heat jacket 110 via the output port 306. Thereafter, the cooled media C flows back to the heat source 170 via the output line 316 such that it may be reheated and then circulated back into the heat jacket 110 as the heated media H via the input line 314 and input port 304.

As shown in FIG. 3, the input port 304 is coupled to the heat source 170 via a input line 314 and the output port 306 is coupled to the heat source 170 via an output line 316. In embodiments, the rotary union 106 is configured to permit fluid flow to travel there through. For example, the rotary union may define at least a pair of internal conduits, with a first of the internal conduits being in communication with the input line 316 in order to direct media from the heat source 170 to the heat jacket 110, and with a second of the internal conduits being in communication with the output line 316 in order to direct media from the heat jacket 110 back to the heat source 170. In these examples, the input line 314 and/or the output line 316 may at least partially extend into and through the first and second internal conduits. In other examples, the input line 314 may comprise a first portion extending between the heat source 170 and the fixed section 130 of the rotary union 106 and a second portion extending between the rotating section 132 of the rotary union 106 (or the shaft 117 projecting therefrom) and the input port 304; similarly, in this example, the output line 316 may comprise a first portion extending between the output port 316 and the rotating section 132 of the rotary union 106 (or the shaft 117 projecting therefrom) and a second portion extending between the fixed section 130 of the rotary union 106 and the heat source 170. Accordingly, the media may flow through the rotary union 106.

In the illustrated embodiment, the heat jacket 110 is integral with (and part of) the evaporation vessel 104. However, in other embodiments, the heat jacket 110 may be separable from or removably attached to the evaporation vessel 104, such that the heat jacket 110 may be removed from the evaporation vessel 104 as desired, for example, the heat jacket 110 may be wrapped around the sidewalls 320 of the evaporation vessel 104. In embodiments where the heat jacket 110 is separable from or removably attached to the evaporation vessel 104, the heat jacket 110 may be a sleeve that is disposed over and around the sidewalls of the evaporation vessel 104.

In the presently illustrated embodiment, the heat jacket 110 defines the sidewalls 320 of the evaporation vessel 104, and the sidewalls 320 define a cylindrical structure extending from a base 322 of the evaporation vessel 104. In embodiments, the heat jacket 110 may also or instead be incorporated into the base 322, such that the base 322 also imparts heating/cooling to the contents contained within the reservoir 126. In the illustrated embodiment, the heat jacket 110 also includes an angled portion 324 disposed at the opposite end 122 of the evaporation vessel 104, wherein the angled portion 324 helps retain contents within the reservoir 126 and inhibit those contents from splashing out of the reservoir 126 during operation of the rotary evaporator. In the illustrated embodiment, the hollow interior 302 also extends within the interior of the angled portion 324; however, in other embodiments, the hollow interior 302 does not extend within the interior of the angled portion 324 or only partially extends there-into.

In embodiments, the rotary evaporator 100 may further include a thermal sensor 330 operable to sense or measure temperature within the reservoir 126. As shown, the thermal sensor 330 is positioned within the reservoir 126 so as to avoid contact with the sample contained within the reservoir 126. Here, the thermal sensor 330 is supported by an external support 332 and extends into the reservoir 126 through the opening 124 defined in the opposite end 122 of the evaporation vessel 104, such that the thermal sensor 330 does not rotate with the evaporation vessel 104 and such that the thermal sensor 330 is stationary relative to the base 102. However, in other embodiments, the thermal sensor 330 may be connected to the evaporation vessel 104 at a location within the reservoir 126.

In the illustrated embodiment, the thermal sensor 330 is in communication with a controller 334 of the heat source 170. In some embodiments, the thermal sensor 330 communicates wirelessly with the controller 334, whereas in other embodiments they communicate via cable or wire. The thermal sensor 330 captures temperature data from within the reservoir 126, with the temperature data being indicative of the temperature within the reservoir 126 of the evaporation vessel 104. The controller 334 receives the temperature data from the thermal sensor 330 and, in some embodiments, the controller 334 is programmed to control the heat source 170 based on the temperature data received from the thermal sensor 330. For example, the controller 334 may automatically cause the heat source 170 to increase, decrease, or maintain the temperature of the media sent to the heat jacket 110 based on the temperature data received from the thermal sensor 330. In embodiments, the controller 334 of the heat source 170 is configured to control a flow rate of the media supplied to the heat jacket 110 based on temperature data received from the thermal sensor 330. For example, the controller 334 may adjust operation of the pump component of the heat source 170 based on the temperature data.

Figure 4B:
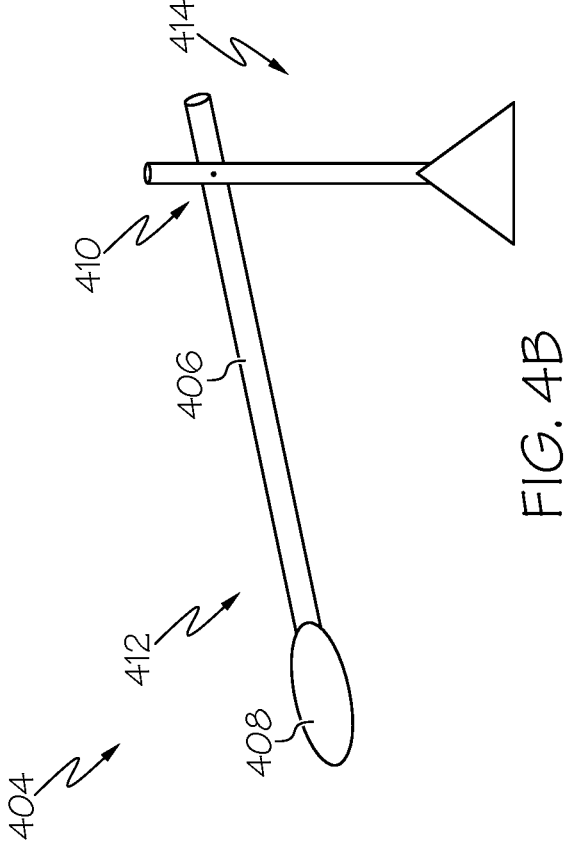
FIG. 4B depicts a scraper that may be utilized within the evaporation vessel to facilitate mixing, according to one or more embodiments of the present disclosure.
Figure 4A:
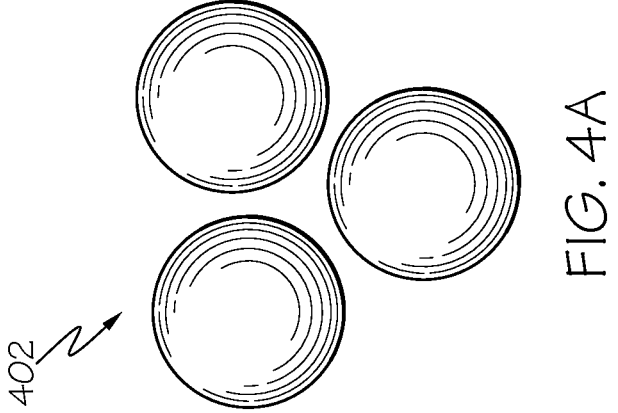
FIG. 4A depicts a plurality of mixing balls that may be utilized within the evaporation vessel to facilitate mixing, according to one or more embodiments of the present disclosure.

Referring now to FIGS. 4A-4D, additional components may be utilized to facilitate the mixing that occurs within the reservoir 126 of the evaporation vessel 104 when the evaporation vessel 104 is rotated about the axis A. FIG. 4A illustrates one or more mixing balls 402, according to one or more embodiments of the present disclosure. While FIG. 4A illustrates the one or more mixing balls 402 as comprising three such mixing balls, more or less than three may be utilized. The one or more mixing balls 402 may roll freely (i.e., be free rollable) within the reservoir 126 when placed therein as they may be unattached to the evaporation vessel 104. In use, the one or more mixing balls 402 are placed in the reservoir 126 of the evaporation vessel 104 and facilitate mixing of the contents as the evaporation vessel 104 is rotated. The one or more mixing balls 402 may be inserted into the reservoir 126 and removed therefrom when the rotary evaporator 100 is turned off or inactive (i.e., when the evaporation vessel 104 is not rotating). However, because of the orientation of the opening 124 of the evaporation vessel 104, the one or more mixing balls 402 may also be inserted into the reservoir 126 and removed therefrom when the rotary evaporator 100 is activated and the evaporation vessel 104 is rotating.

FIG. 4B illustrates a scraper 404 that is utilizable to facilitate mixing, according to one or more embodiments of the present disclosure. In the illustrated embodiment, the scraper 404 includes a shaft 406 and a scraper portion 408. The shaft 406 includes a free end 410 and an opposite end 412 on which the scraper portion 408 is mounted. During use, the user may insert the scraper 104 through the opening 124 and into the reservoir 126 so as to facilitate mixing; whereas, in other embodiments, the free end 410 of the scraper is connected to an external support station 414 that supports the scraper 404 in a manner such that the scraper 404 may extend through the opening 124 and into the reservoir 126 as mentioned above. Also, while FIG. 4B illustrates just one scraper 404, more than one scraper 404 may be utilized.

Figure 4C:
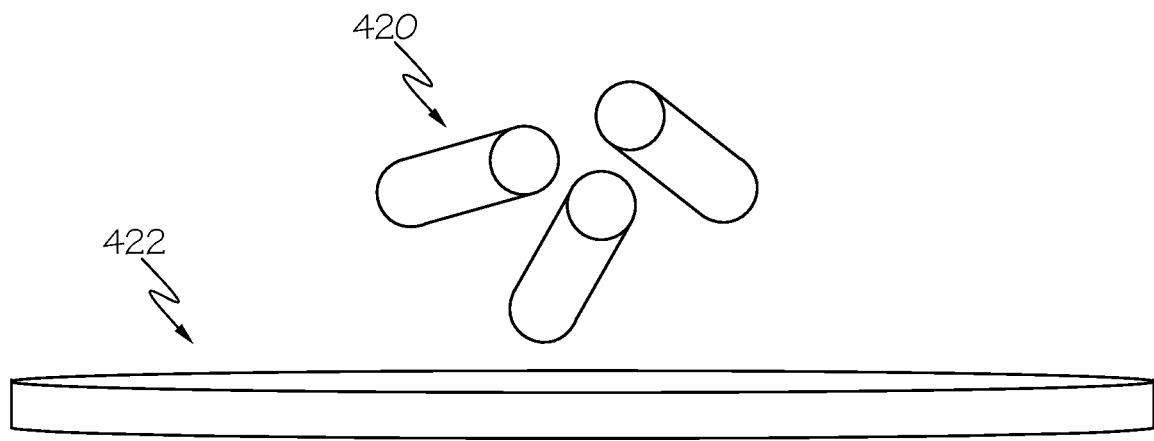
FIG. 4C depicts a plurality of magnetic stir bars that may be utilized within the evaporation vessel to facilitate mixing, according to one or more embodiments of the present disclosure.

FIG. 4C illustrates one or more magnetic stir bars 420 utilizable to facilitate mixing, according to one or more embodiments of the present disclosure. The one or more magnetic stir bars 420 are freely movable within the reservoir 126 and each include magnetic material such that react (and are movable) in the presence of a magnetic field due to their interaction with the magnetic field. In embodiments, a magnetic plate 422 may be utilized to generate and control the magnetic field, so as to thereby control movement of the one or more magnetic stir bars 420 within the reservoir 126. Where utilized the magnetic plate 422 is positioned outside of the evaporation vessel 104. In other embodiments, the magnetic plate 422 is integrated within the evaporation vessel 104.

Figure 4D:
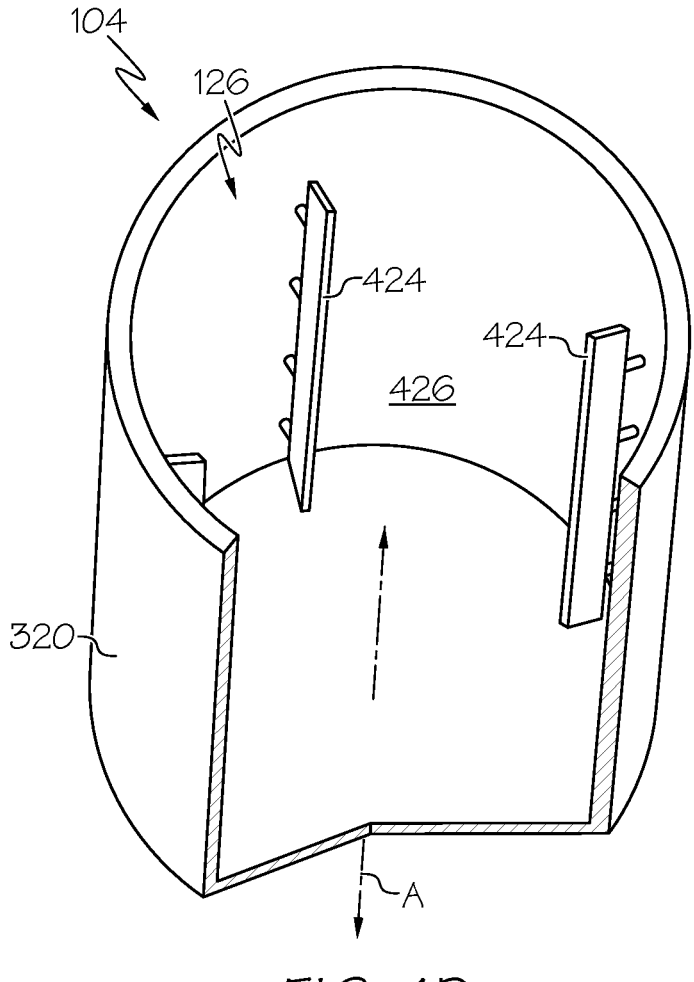
FIG. 4D depicts the evaporation vessel incorporating a plurality of baffles extending within the reservoir of the evaporation vessel to facilitate mixing, according to one or more embodiments of the present disclosure.

FIG. 4D is a cut-away view of an embodiment of the evaporation vessel 104 having one or more baffles 424 utilizable to facilitate mixing within the reservoir 126, according to one or more embodiments of the present disclosure. As shown, the one or more baffles are attached to an inner surface 426 of the sidewalls 320 of the evaporation vessel 104, and extend radially inward within the reservoir 126 of the evaporation vessel 104, from the inner surface 426 towards the axis A. In the illustrated example, the one or more baffles 424 includes three baffles; however, more or less than three may be utilized. In even other embodiments, features are formed on the inner surface 426 that protrude inward into the reservoir 126 and move the contents of the evaporation vessel 104 towards the opening 124 as the evaporation vessel 104 is rotated, for example, the features may include a helical blade or screw that extends helically around the inner surface 426 from the mounting end 120 towards the opposite end 122.

Referring to FIG. 5, a method 500 of using the rotary evaporator 100 is depicted. As described herein, the method 500 is utilizable for impregnating metal from a metal containing solution onto a catalyst support. In a first step 502, the method 500 includes loading the catalyst support in the reservoir 126 of the evaporation vessel 104. As previously mentioned, the evaporation vessel 104 includes the mounting end 120, the opposite end 122 that is opposite the mounting end 120, and the opening 124 is defined in the opposite end 122, where the opening 124 is in fluid communication with the reservoir 126 and the catalyst support is loaded into the reservoir 126 through the opening 124. Also, as previously noted, the mounting end 120 of the evaporation vessel 104 is coupled to the rotary union 106, with the rotary union including the fixed section 130 and the rotating section 132 that is rotatable relative to the fixed section 130, with the fixed section 130 extending along the axis A and being fixedly coupled to the base 102, and with the rotating section 132 being coupled to the mounting end 120 of the evaporation vessel 104 such that the rotating section 132 of the rotary union 106 and the evaporation vessel 104 are rotatable together about the axis A relative to the fixed section 130 of the rotary union 106 and the base 102. In embodiments, the catalyst support may include porous ceramic materials having various shapes, such as, for example, cylinders, spheres, multi-lobe shapes (e.g., such as trilobes, quadrilobes, etc.), etc. In embodiments, the catalyst support may be formed by crushing the cylinders, spheres, and/or multi-lobe shapes. In embodiments, the metal containing solution may include a metal salt or multiple metals and a solvent (e.g., water, alcohol, etc.).

In a second step 504, the method 500 includes wetting the catalyst support with water vapor injected into the reservoir 126 through the purge tube 112 that at least partially extends into the reservoir 126 of the evaporation vessel through the opening 124. As previously mentioned, the purge system 114 may be utilized in the second step 504 to apply the water vapor to the catalyst support contained in the reservoir 126. In embodiments, the water vapor is mixed with the purge gas, as mentioned above. In embodiments, the catalyst support is wetted with water vapor at a temperature range of greater than or equal to 20° Celsius ("C") to less than or equal to 80° C. and/or at a pressure of at least 1 bar to at most 6 bars (i.e., where the method 500 is conducted at atmospheric pressure). In embodiments, the catalyst support is wetted with water vapor at a temperature range of greater than or equal to 20° C. to less than or equal to 50° C. In embodiments, the catalyst support is wetted with water vapor at a pressure of 1 bar. The purge system 114, including the water vapor dispenser 202, will allow the catalyst carrier to adsorb water vapor at controlled rate and saturate the surface sites.

In a third step 506, the method 500 includes transferring the metal containing solution onto the wetted catalyst support contained in the evaporation vessel 104. In embodiments, the metal containing solution may be poured into the evaporation vessel 104 or by slowing adding the metal containing solution via pipette (i.e., pipetting the metal containing solution into the evaporation vessel 104) while the catalyst support is being mixed. In a fourth step 508, the method 500 includes rotating the evaporation vessel 104 about the axis A via the motor 108. The motor 108 may rotate the evaporation vessel 104 at various rotation speeds, for example, at a rotation speed of at least 1 revolutions per minute ("RPM") to at most 20 RPM. In embodiments, the rotation speed output by the motor 108 is adjusted during the fourth step 508 and/or during subsequent steps detailed below.

In a fifth step 510, the method 500 includes heating the reservoir 126 of the evaporation vessel 104 to thereby evaporate liquid from the metal containing solution and thereby deposit the metal onto the catalyst support. As mentioned above, the evaporation vessel 104 is heated via flowing media into and through the heat jacket 110, which is operable to heat or cool the reservoir 126 of the evaporation vessel 104. The heat source 170 heats or cools the media and then supplies that media to the hollow interior 302 of the heat jacket 110. In embodiments, the temperature of the media is controlled/adjusted by the controller 334 of the heat source 170 based on the temperature data received from the thermal sensor 330. In embodiments, the flow rate of the media is controlled/adjusted by the controller 334 of the heat source 170, for example, based on the temperature data received from the thermal sensor 330. In embodiments, the rotation speed output by the motor 108 is adjusted during the fifth step 510.

In embodiments, the fourth step 508 and the fifth step 510 are performed at the same time (i.e., the rotating and the heating occur simultaneously), such that the metal containing solution and the catalyst support are rotated within the evaporation vessel 104 while it is heated to thereby evaporate the water. In other embodiments, heat is applied first before rotation or rotation is started before application of heat. In embodiments, during the fifth step 510, the heat jacket 110 heats the metal containing solution and the catalyst support contained in the reservoir 126 to a temperature range of greater than or equal to −50° C. to at most 180° C. in order to facilitate the evaporation and, in even other embodiments, the heat jacket 110 heats the metal containing solution and the catalyst support contained in the reservoir 126 to a temperature range of at least 20° C. to at most 150° C.

In embodiments, the method 500 further includes a sixth step 512 of drying the metal which has been deposited onto the catalyst support. In some of these embodiments, a calcination oven is utilized to dry the metal and, in some embodiments, the calcination oven dries the metal at a temperature range of at least 300° C. to at most 700° C.

Accordingly, embodiments of the rotary evaporator 100 and the method 500 of using the same allow the operator thereof to access the reservoir 126 during heating and/or rotation and provide a means for mixing the contents of the reservoir during heating and/or rotation. When used for impregnation, these features will significantly improve the quality of the catalyst, especially metal distribution, and provide a means of achieving uniform metal distribution. Also, embodiments of the rotary evaporator 100 and the method 500 of using the same provide a means of controlling (or minimizing) the heat generated when the catalyst is exposed to metal solution (i.e., when the metal solution is added), particularly in large quantity preparation, by exposing the catalyst carrier to water vapor before the impregnation.

One or more aspects of the present disclosure are described here. A first aspect of the present disclosure may include a rotary evaporator including a base; an evaporation vessel having a mounting end and an opposite end, the evaporation vessel comprising an opening defined in the opposite end and a reservoir in communication with the opening for receiving a sample through the opening; a rotary union having a fixed section and a rotating section that is rotatably coupled to the fixed section, wherein the fixed section extends along an axis and is fixedly coupled to the base, and wherein the rotating section is coupled to the mounting end of the evaporation vessel such that the rotating section of the rotary union and the evaporation vessel are rotatable about the axis relative to the fixed section of the rotary union and the base; a motor operable to cause rotation of the rotating section of the rotary union and the evaporation vessel about the axis; a heat jacket for heating or cooling the sample when contained in the evaporation vessel; a purge tube at least partially extending into the reservoir of the evaporation vessel through the opening, such that a vapor channel is defined between an inner surface of the reservoir and an outer surface of the purge tube; and a purge system for controllably supplying fluid to the evaporation vessel via the purge tube, wherein the fluid comprises water vapor, gas, or a combination thereof.

A second aspect of the present disclosure may include the first aspect, wherein the purge system comprises a water vapor dispenser in communication with an inner lumen of the purge tube for supplying water vapor to within the evaporation vessel.

A third aspect of the present disclosure may include the second aspect, wherein the purge system comprises a valve, a mass flow controller, or a combination thereof, in communication with the water vapor dispenser for controlling supply of water vapor.

A fourth aspect of the present disclosure may include the first aspect, wherein the purge system further comprises a gas dispenser in communication with the inner lumen of the purge tube for supplying a purge gas to within the evaporation vessel.

A fifth aspect of the present disclosure may include the fourth aspect, wherein the purge system comprises a valve, a mass flow controller, or a combination thereof, for controlling flow rate of the purge gas.

A sixth aspect of the present disclosure may include the fourth aspect, wherein the purge gas supplied by the gas dispenser comprises air.

A seventh aspect of the present disclosure may include the fourth aspect, wherein the gas dispenser further comprises a heater configured for controlling temperature of the purge gas supplied to the evaporation vessel.

An eighth aspect of the present disclosure may include the first aspect, wherein the purge system further comprises a water vapor dispenser and a gas dispenser, the water vapor dispenser is in communication with an inner lumen of the purge tube for supplying water vapor to within the evaporation vessel, and the gas dispenser is in communication with the inner lumen of the purge tube for supplying a purge gas to within the evaporation vessel.

A ninth aspect of the present disclosure may include the eighth aspect, wherein the purge system comprises a valve, a mass flow controller, or a combination thereof, in communication with the water vapor dispenser and the gas dispenser for controlling supply of water vapor and the purge gas.

A tenth aspect of the present disclosure may include the first aspect, further comprising an actuator coupled to the purge tube for adjusting position of the purge tube relative to the evaporation vessel.

An eleventh aspect of the present disclosure may include the first aspect, wherein the base is configured to be tilted to thereby adjust orientation of the evaporation vessel.

A twelfth aspect of the present disclosure may include the first aspect, wherein the motor is mounted on the base.

A thirteenth aspect of the present disclosure may include the first aspect, wherein the motor is operatively coupled to the rotating section of the rotary union via a belt or via one or more gears.

A fourteenth aspect of the present disclosure may include the first aspect, wherein the mounting end of the evaporation vessel is coupled to the rotating section of the rotary union via a clamp mechanism, wherein the clamp mechanism is adjustable so as to receive a differently sized evaporation vessel.

A fifteenth aspect of the present disclosure may include the fourteenth aspect, wherein the clamp mechanism comprises a plurality of adjustable fingers that are movable relative to each other.

A sixteenth aspect of the present disclosure may include the first aspect, further comprising a support wheel supporting the rotating section of the rotary union.

A seventeenth aspect of the present disclosure may include the first aspect, further comprising a heat source in communication with the heat jacket for supplying a media to the heat jacket for heating or cooling the heat jacket.

An eighteenth aspect of the present disclosure may include the seventeenth aspect, wherein the media flows through the rotary union.

An nineteenth aspect of the present disclosure may include the seventeenth aspect, further comprising a thermal sensor operable to sense temperature within the reservoir.

A twentieth aspect of the present disclosure may include the nineteenth aspect, wherein the thermal sensor is in communication with a controller of the heat source, wherein the controller of the heat source is configured to automatically control temperature output via the heat jacket based on temperature data received from the thermal sensor, wherein the temperature data is indicative of temperature within the evaporation vessel.

A twenty first aspect of the present disclosure may include the twentieth aspect, wherein the controller of the heat source is configured to control flow rate of the media supplied to the heat jacket based on temperature data received from the thermal sensor.

A twenty second aspect of the present disclosure may include the seventeenth aspect, wherein the thermal sensor extends into the reservoir of the evaporation vessel through the opening defined in the opposite end of the evaporation vessel.

A twenty third aspect of the present disclosure may include the twenty second aspect, wherein the thermal sensor is fixed relative to the base.

A twenty fourth aspect of the present disclosure may include the first aspect, wherein the heat jacket is integral with the evaporation vessel.

A twenty fifth aspect of the present disclosure may include the first aspect, wherein the heat jacket is removably attached to the evaporation vessel.

A twenty sixth aspect of the present disclosure may include the first aspect, further comprising a trunnion that is mounted to the base and that supports the rotary union.

A twenty seventh aspect of the present disclosure may include the first aspect, wherein the opening in the opposite end of the evaporation vessel comprises a diameter that is greater than or equal to 5 cm.

A twenty eighth aspect of the present disclosure may include the first aspect, further comprising one or more of the following: one or more mixing balls freely rollable within the reservoir; one or more scrapers extending into the reservoir through the opening; one or more magnetic stir bars freely movable within the reservoir, the one or more magnetic stir bars being freely movable relative to the evaporation vessel via interaction with a magnetic field; or one or more baffles disposed on an internal surface of the evaporation vessel that defines the reservoir.

A twenty ninth aspect of the present disclosure may include a method of impregnating metal from a metal containing solution onto a catalyst support, the method comprising: loading the catalyst support in a reservoir of an evaporation vessel, wherein: the evaporation vessel comprises a mounting end, an opposite end that is opposite the mounting end, and an opening defined in the opposite end that is in communication with the reservoir and through which the catalyst support is loaded, and the mounting end of the evaporation vessel is coupled to a rotary union, the rotary union comprising a fixed section and a rotating section that is rotatable relative to the fixed section, with the fixed section extending along an axis and being fixedly coupled to a base, and with the rotating section being coupled to the mounting end of the evaporation vessel such that the rotating section of the rotary union and the evaporation vessel are rotatable together about the axis relative to the fixed section of the rotary union and the base; wetting the catalyst support with water vapor injected into the reservoir through a purge tube that at least partially extends into the reservoir of the evaporation vessel through the opening; transferring the metal containing solution onto the catalyst support contained in the evaporation vessel; rotating the evaporation vessel about the axis via a motor; and heating the reservoir to thereby evaporate liquid from the metal containing solution and thereby deposit the metal onto the catalyst support.

A thirtieth aspect of the present disclosure may include the twenty ninth aspect, wherein the catalyst support is wetted at a temperature of greater than or equal to 20° Celsius and less than or equal than 80° Celsius.

A thirty first aspect of the present disclosure may include the twenty ninth aspect, wherein the catalyst support is wetted at a pressure of greater than or equal to 1 bar and less than or equal than 6 bars.

A thirty second aspect of the present disclosure may include the twenty ninth aspect, wherein the evaporation vessel is heated via a heat jacket operable to heat or cool the reservoir of the evaporation vessel.

A thirty third aspect of the present disclosure may include the thirty second aspect, wherein the heat jacket heats the reservoir to a temperature of greater than or equal to –50° Celsius and less than or equal than 180° Celsius.

A thirty fourth aspect of the present disclosure may include the twenty ninth aspect, further comprising drying the metal which has been deposited onto the catalyst support.

A thirty fifth aspect of the present disclosure may include the thirty fourth aspect, wherein the drying occurs in a calcination oven.

A thirty sixth aspect of the present disclosure may include the thirty fourth aspect, wherein the drying occurs at a temperature range of at least 300° Celsius to at most 700° Celsius.

A thirty seventh aspect of the present disclosure may include the thirty fourth aspect, wherein the rotating and the heating occur simultaneously.

Directional terms as used herein—for example up, down, right, left, front, back, top, bottom, upper, lower—are made only with reference to the figures as drawn and are not intended to imply absolute orientation. The terms "proximal" and "distal" are defined herein relative to a sample contained in a reservoir of an evaporation vessel. The term "distal" refers to the position of an element that is closer to the sample in the reservoir and the term "proximal" refers to the position of an element that is further away from the sample in the reservoir.

It is noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be appar-ent that modifications and variations are possible without departing from the scope of the present disclosure, includ-ing, but not limited to, embodiments defined in the appended claims. More specifically, although some aspects of the present disclosure are identified herein as preferred or par-ticularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended pre-amble term "comprising."

What is claimed is:

1. A rotary evaporator comprising:
a base;
an evaporation vessel having a mounting end and an opposite end, the evaporation vessel comprising an opening defined in the opposite end and a reservoir in communication with the opening for receiving a sample through the opening;
a rotary union having a fixed section, a rotating section that is rotatably coupled to the fixed section, and internal conduits defined in the fixed section of the rotary union, wherein the fixed section extends along an axis and is fixedly coupled to the base, and wherein the rotating section is coupled to the mounting end of the evaporation vessel such that the rotating section of the rotary union and the evaporation vessel are rotat-able about the axis relative to the fixed section of the rotary union and the base;
a motor operable to cause rotation of the rotating section of the rotary union and the evaporation vessel about the axis;
a heat jacket for heating or cooling the sample when contained in the evaporation vessel, the heat jacket comprising a hollow interior;
a heat source in fluid communication with the hollow interior of the heat jacket, the heat source comprising a pump component operable to circulate a media through the heat jacket for heating or cooling the heat jacket, and wherein the media is configured to flow through the internal conduits defined in the fixed section of the rotary union;
a purge tube at least partially extending into the reservoir of the evaporation vessel through the opening, such that a vapor channel is defined between an inner surface of the reservoir and an outer surface of the purge tube; and
a purge system for controllably supplying fluid to the evaporation vessel via the purge tube, wherein the fluid comprises water vapor, gas, or a combination thereof.

2. The rotary evaporator of claim 1, wherein the purge system further comprises a water vapor dispenser and a gas dispenser, the water vapor dispenser is in communication with an inner lumen of the purge tube for supplying water vapor to within the evaporation vessel, and the gas dispenser is in communication with the inner lumen of the purge tube for supplying a purge gas to within the evaporation vessel.

3. The rotary evaporator of claim 2, wherein the purge system comprises a valve, a mass flow controller, or a combination thereof, in communication with the water vapor dispenser and the gas dispenser for controlling supply of water vapor and the purge gas.

4. The rotary evaporator of claim 2, wherein the gas dispenser further comprises a heater configured for controlling temperature of the purge gas supplied to the evaporation vessel.

5. The rotary evaporator of claim 1, further comprising an actuator coupled to the purge tube for adjusting position of the purge tube relative to the evaporation vessel.

6. The rotary evaporator of claim 1, wherein the base is configured to be tilted to thereby adjust orientation of the evaporation vessel.

7. The rotary evaporator of claim 1, wherein the motor is operatively coupled to the rotating section of the rotary union via a belt or via one or more gears.

8. The rotary evaporator of claim 1, wherein the mounting end of the evaporation vessel is coupled to the rotating section of the rotary union via a clamp mechanism, the clamp mechanism comprising a plurality of adjustable fingers that are movable relative to each other so as to receive a differently sized evaporation vessel.

9. The rotary evaporator of claim 1, further comprising a thermal sensor operable to sense temperature within the reservoir.

10. The rotary evaporator of claim 9, wherein the thermal sensor is in communication with a controller of the heat source, wherein the controller of the heat source is configured to automatically control temperature output via the heat jacket based on temperature data received from the thermal sensor, wherein the temperature data is indicative of temperature within the evaporation vessel.

11. The rotary evaporator of claim 10, wherein the controller of the heat source is configured to control flow rate of the media supplied to the heat jacket based on temperature data received from the thermal sensor.

12. The rotary evaporator of claim 1, further comprising one or more of the following:
    one or more mixing balls freely rollable within the reservoir;
    one or more scrapers extending into the reservoir through the opening;
    one or more magnetic stir bars freely movable within the reservoir, the one or more magnetic stir bars being freely movable relative to the evaporation vessel via interaction with a magnetic field; or
    one or more baffles disposed on an internal surface of the evaporation vessel that defines the reservoir.

13. The rotary evaporator of claim 1, wherein:
    the heat jacket comprises the hollow interior as well as an inlet port and an outlet port fluidly connected thereto; and
    the media is configured to circulate from:
        the heat source to one of the internal conduits via a first portion of an inlet line in communication with the heat source and one of the internal conduits,
        the one of the internal conduits to the hollow interior of the heat jacket via a second portion of the inlet line in communication with the one of the internal conduits and the inlet port,
        the hollow interior of the heat jacket to another one of the internal conduits via a first portion of an outlet line in communication with the heat source and the another one of the internal conduits, and
        the another one of the internal conduits to the heat source via a second portion of the outlet line in communication with the another one of the internal conduits and the heat source.

14. A method of impregnating metal from a metal containing solution onto a catalyst support, the method comprising:
    loading the catalyst support in a reservoir of an evaporation vessel, wherein:
        the evaporation vessel comprises a mounting end, an opposite end that is opposite the mounting end, and an opening defined in the opposite end that is in communication with the reservoir and through which the catalyst support is loaded, and
        the mounting end of the evaporation vessel is coupled to a rotary union, the rotary union comprising a fixed section a rotating section that is rotatable relative to the fixed section, and internal conduits defined in the fixed section of the rotary union, with the fixed section extending along an axis and being fixedly coupled to a base, and with the rotating section being coupled to the mounting end of the evaporation vessel such that the rotating section of the rotary union and the evaporation vessel are rotatable together about the axis relative to the fixed section of the rotary union and the base;
    wetting the catalyst support with water vapor injected into the reservoir through a purge tube that at least partially extends into the reservoir of the evaporation vessel through the opening;
    transferring the metal containing solution onto the catalyst support contained in the evaporation vessel;
    rotating the evaporation vessel about the axis via a motor;
    supplying a media through the internal conduits of the fixed section of the rotary union to a hollow interior of a heat jacket via a pump component of a heat source that is in fluid communication with the hollow interior of the heat jacket, thereby heating the heat jacket; and
    heating the reservoir, via the heat jacket, to thereby evaporate liquid from the metal containing solution and thereby deposit the metal onto the catalyst support, wherein the heat jacket is operable to heat or cool the reservoir of the evaporation vessel.

15. The method of claim 14, wherein the catalyst support is wetted at a temperature of greater than or equal to 20° Celsius and less than or equal than 80° Celsius.

16. The method of claim 14, wherein the catalyst support is wetted at a pressure of greater than or equal to 1 bar and less than or equal than 6 bars.

17. The method of claim 14, wherein the heat jacket heats the reservoir to a temperature of greater than or equal to −50° Celsius and less than or equal than 180° Celsius.

18. The method of claim 14, further comprising drying the metal which has been deposited onto the catalyst support, wherein the drying occurs at a temperature range of at least 300° Celsius to at most 700° Celsius.

19. The method of claim 18, wherein the rotating and the heating occur simultaneously.

20. The method of claim 14, wherein:
    the heat jacket comprises the hollow interior as well as an inlet port and an outlet port fluidly connected thereto; and
    supplying the media through the internal conduits of the fixed section of the rotary union to the hollow interior of the heat jacket comprises:
        circulating the medium from the heat source to one of the internal conduits via a first portion of an inlet line in communication with the heat source and one of the internal conduits,
        circulating the medium from the one of the internal conduits to the hollow interior of the heat jacket via a second portion of the inlet line in communication with the one of the internal conduits and the inlet port, circulating the medium from the hollow interior of the heat jacket to another one of the internal conduits via a first portion of an outlet line in communication with the heat source and the another one of the internal conduits, and circulating the medium to the another one of the internal conduits to the heat source via a second portion of the outlet line in communication with the another one of the internal conduits and the heat source.

\*   \*   \*   \*   \*